United States Patent
Chacko (10) Patent No.: US 7,554,793 B2
(45) Date of Patent: Jun. 30, 2009

(54) LOW TEMPERATURE CURABLE CONDUCTIVE ADHESIVE AND CAPACITORS FORMED THEREBY

(75) Inventor: Antony P. Chacko, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 158 days.

(21) Appl. No.: 11/600,657

(22) Filed: Nov. 16, 2006

(65) Prior Publication Data

US 2008/0116416 A1 May 22, 2008

(51) Int. Cl.
*H01G 9/02* (2006.01)
(52) U.S. Cl. ............... 361/525; 361/523; 361/528; 361/529; 361/516; 361/519; 29/25.01; 29/25.03
(58) Field of Classification Search .......... 361/525, 361/523, 528–529, 516–519; 29/25.01, 25.03
See application file for complete search history.

(56) References Cited

U.S. PATENT DOCUMENTS 5,910,370 A * 6/1999 Katsura et al. ........... 428/425.5

(Continued)

FOREIGN PATENT DOCUMENTS

JP 2003306659 4/2002

OTHER PUBLICATIONS

XP002512721, Feb. 21, 2001, Database WPI Thomson Scientific, London.

(Continued)

*Primary Examiner*—Nguyen T Ha
(74) *Attorney, Agent, or Firm*—Joseph T. Guy; Nexsen Pruet, LLC (57) ABSTRACT

An improved conductive adhesive and capacitor formed using the improved conductive adhesive. The conductive adhesive has:
60-95 wt % conductor;
5-40 wt % resin; wherein the resin has:
55-98.9 wt % monomer defined by the formula:

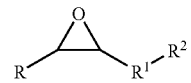

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group;
0.1-15 wt % catalyst;
1-30 wt % accelerant defined by the formula:

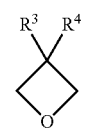

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

61 Claims, 3 Drawing Sheets

U.S. PATENT DOCUMENTS

| | | | |
|---|---|---|---|
| 6,086,642 A * | 7/2000 | Fukaumi et al. | 29/25.03 |
| 6,165,386 A * | 12/2000 | Endo et al. | 252/500 |
| 6,473,293 B2 | 10/2002 | Shimada et al. | 361/523 |
| 6,666,994 B2 | 12/2003 | Takezawa et al. | 252/518.1 |
| 6,780,898 B2 | 8/2004 | Kumakura | 522/168 |
| 6,881,765 B2 | 4/2005 | Sasaki | 522/167 |
| 7,023,689 B2 | 4/2006 | Matsummoto et al. | 361/523 |
| 2004/0125543 A1 | 7/2004 | Hirano et al. | 361/523 |
| 2004/0225045 A1 | 11/2004 | Forray | 524/262 |
| 2006/0009547 A1 | 1/2006 | Maeshima et al. | 523/427 |
| 2006/0111496 A1 | 5/2006 | Gillissen et al. | 524/403 |

OTHER PUBLICATIONS

XP002512722, Jul. 5, 2006, Database WPI Thomson Scientific London.

International Search Report, Nov. 16, 2007, Kemet Electronics Corporation, Autorized Officer Alicja Van der Heijden.

* cited by examiner

FIG. 5

LOW TEMPERATURE CURABLE CONDUCTIVE ADHESIVE AND CAPACITORS FORMED THEREBY

CROSS-REFERENCE TO RELATED APPLICATIONS

The present invention is related to U.S. patent application Ser. No. 11/499,366 filed Aug. 4, 2006 which is incorporated by reference.

BACKGROUND

The present invention is related to an improved method of forming a solid electrolyte capacitor and an improved capacitor formed thereby. More specifically, the present invention is related to a low temperature curable conductive adhesive used for formation of a conductive layer in a capacitor and an improved capacitor formed thereby.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as 7,7',8,8'-tetracyanoquinonedimethane (TCNQ) complex salt, or intrinsically conductive polymers, such as polyaniline, polypyrol, polyethylenedioxythiophene and their derivatives. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically consists of several layers which are external to the anode body. In the case of surface mount constructions these layers typically include: a carbon layer; a layer containing a highly conductive metal, typically silver, bound in a polymer or resin matrix; a conductive adhesive layer such as silver filled adhesive; and a highly conductive metal lead frame. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or spray techniques with other less desirable techniques being reported.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with silver layer, buildup, and mechanical properties.

The silver layer serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties. Compatibility with the subsequent layers employed in the assembly and encapsulation of the capacitor are also critical. In the case where a silver filled adhesive is used to attach to a lead frame compatibility between the lead frame and the silver filled adhesive is an issue. In capacitors which utilize solder to connect to the external lead solderability and thermal stability are important factors. In order for the solder to wet the silver layer, the resin in the silver must degrade below the temperature at which the solder is applied. However, excessive degradation of the resin creates an effect termed "silver leeching" resulting in a poor connection between the external cathode layers and the external cathode lead. The traditional approach to applying a silver layer requires a delicate compromise in thermal stability of the resin in order to simultaneously achieve solder wetting and to avoid silver leeching.

The silver layer is secured to a cathode lead frame by an adhesive. The adhesive is typically a silver filled resin which is cured after the capacitor is assembled. Typical resin layers have a long cure time which limits productivity. More rapid curing adhesives are typically detrimental with regards to electrical properties. There has been an ongoing desire to improve the curing of the silver layer without detriment to the electrical properties of the capacitor.

Through diligent research the present inventor has developed a carbon layer which circumvents the problems encountered in the prior art.

SUMMARY

It is an object of the present invention to provide an improved conductive adhesive.

A particular feature of the improved conductive adhesive is the ability to cure rapidly.

It is another object of the present invention to provide a capacitor comprising the improved conductive adhesive wherein the capacitor has improved properties owing to the improved adhesion between the cathode lead frame and cathodic layers of the capacitor.

It is another object of the present invention to provide an improved method for manufacturing capacitors.

It is another object of the present invention to provide a capacitor with improved conduction between conductive layers and the lead frame without detriment to the adhesion between these layers.

A particular feature of the present invention is the ability to provide the improvements with minor changes in the manufacturing and with improved yields due to the decrease in the amount of unusable material which typically results from either poor adhesion or poor conductivity between layers.

These, and other advantages, are provided in a conductive adhesive. The conductive adhesive has:
60-95 wt % silver;
5-40 wt % resin;

wherein the resin has:
55-98.9 wt % monomer defined by the formula:

wherein: R is an aliphatic group of 1 to 10 carbons;
$R^1$ is an aliphatic group of 1 to 10 carbons;
$R^2$ is an alkyl, alkyl ether, aryl ether, silane or silicone; and wherein R and $R^1$, R and $R^2$ or $R^1$ and $R^2$ may be taken together to form a cyclic alkyl or aryl group;
0.1-15 wt % catalyst preferably based on quaternary ammonium salts of strong acids;
1-30 wt % accelerant defined by the formula:

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

Yet another embodiment is provided in a capacitor with an anode, a dielectric coated on the anode, a conductive layer coated on the dielectric, a cathode lead; and a conductive adhesive layer between the conductive layer and the cathode lead. The conductive adhesive layer has
60-95 wt % silver;
5-40 wt % resin;

wherein the resin has:
55-98.9 wt % monomer defined by the formula:

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group;
0.1-15 wt % catalyst;
1-30 wt % accelerant defined by the formula:

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

Yet another embodiment is provided in a process for forming a capacitor. The process includes the steps of:
forming an anode;
forming a dielectric layer on the anode;
forming a conductive layer on the dielectric layer;
applying a conductive adhesive to the conductive layer wherein the conductive adhesive has
60-95 wt % silver;
5-40 wt % resin;
wherein the resin has:
55-98.9 wt % monomer defined by the formula:

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group;
0.1-15 wt % catalyst;
1-30 wt % accelerant defined by the formula:

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

DETAILED DESCRIPTION

The present invention mitigates the deficiencies of the prior art by providing an improved conductive adhesive which is particularly suitable for use in capacitors and the manufacture thereof. The improved conductive adhesive increases productivity without detriment to the electrical properties of the capacitor. The present invention will be described with reference to the various figures which illustrate, without limiting, the invention.

Figure 1:
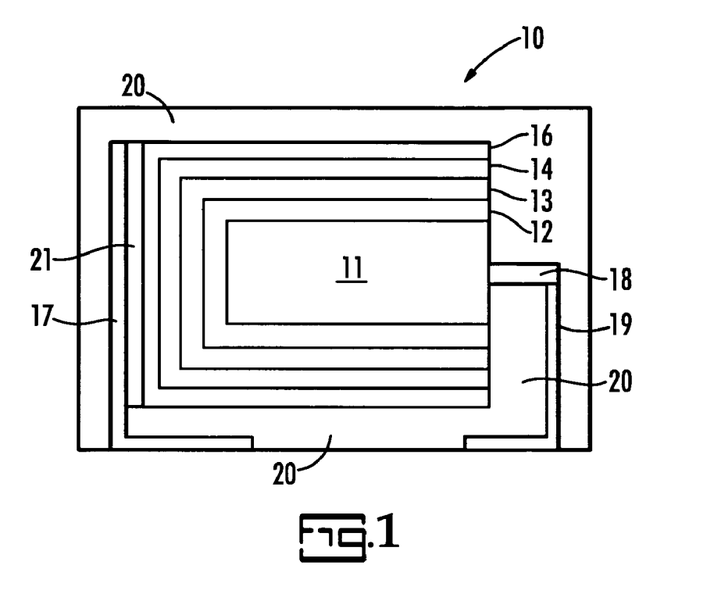
FIG. 1 is a schematic representation of a capacitor of the present invention.

In FIG. 1, a cross-sectional schematic view of a capacitor is shown as represented at 10. The capacitor comprises an anode, 11, comprising a valve metal as described herein. A dielectric layer, 12, is provided on the surface of the anode, 11. The dielectric layer is preferably formed as an oxide of the valve metal as further described herein. Coated on the surface of the dielectric layer, 12, is a conductive layer, 13. The conductive layer preferably comprises conductive polymer, such as polyethylenedioxythiophene (PEDT), polyaniline or polypyrrole or their derivatives; manganese dioxide, lead oxide or combinations thereof. A carbon layer, 14, and silver layer, 16, provide electrical conductivity and provide a surface which is more readily adhered to the cathode terminal, 17, than is the cathode layer, 13. The adhesive layer, 21, secures the cathode lead to the silver layer. The present invention is primarily directed to the improved conductive adhesive and the use of the improved conductive adhesive in securing the lead frame to the silver layer in a capacitor.

The carbon layer together with the silver layer and adhesive layer provides a strongly adhered conductive path between the conductive layer, 13, and the cathode terminal, 17. An anode wire, 18, provides electrical contact between the anode, 11, and an anode terminal, 19. The entire element, except for the terminus of the terminals, is then preferably encased in a non-conducting material, 20, such as an epoxy resin.

The capacitor is illustrated in FIG. 1 as a discrete capacitor. In an alternate embodiment the anode wire, 18, and silver layer, 16, may be in direct electrical contact with a circuit trace wherein elements of the circuit may constitute the cathode lead, anode lead or both. The capacitor may be embedded in a substrate or incorporated into an electrical component with additional functionality.

The carbon layer comprises a conductive composition comprising resin and carbon conductive particles. The carbon layer may also comprise adjuvants such as crosslinking additives, surfactants and dispersing agents. The resin, conductive carbon particles and adjuvants are preferably dispersed in an organic solvent or water to form a coating solution.

It is most preferable that the dried conductive carbon composition comprises about 5-75 wt % polymer resin and about 25-95 wt % conductor. More preferably, the conductive composition comprises about 5-25 wt % polymer resin and most preferably the conductive composition comprises about 15-20 wt % polymer resin. The conductive particles preferably comprise carbon nanotubes.

The resin for the conductive carbon layer is preferably a polymer capable of forming secondary bonding with conductive particles and nanotubes. Preferred resins are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The carbon layer is preferably dispersed in an organic solvent. Preferably the organic solvent is present in an amount of 20-90 wt %. More particularly the organic solvent is present in an amount of 40-60 wt %. The organic solvent is preferable selected from glycol ethers, glycol ether ester, N-methyl pyrrolidone, dimethyl formamide, xylene, etc. A particularly preferred solvent is glycol ether ester due to the good polymer solubility and high boiling point.

Carbon nanotubes are strand like fibers of graphene (a single planar sheet of $sp^2$ bonded carbon atoms) related structures with a cross-sectional diameter in the nanometer range and a very high aspect ratio. Single-walled carbon nanotubes (SWNT) have a diameter in the range of 1-200 nm. More preferably, the single walled carbon nanotubes have a diameter in the range of 1-50 nm and even more preferably 1-20 nm. A diameter of 1-2 nm is most preferable for demonstration of the technology however the cost is currently prohibitive for large scale use. The length of the SWNT nanotubes is at least about 200 nm. Multi-walled nanotubes are less preferred than single-walled nanotubes however they are readily available commercially. Vapor grown carbon fiber (VGCF) is a form of carbon tube with a diameter of 50-200 nm and a length of at least 5 μm and is a highly crystalline fine carbon fiber synthesized by the vapor-phase method.

The silver layer comprises silver and a resin. It is most preferable that the silver layer be at least 5 μm thick. The silver composition of the silver layer is preferably 40 wt % to no more than about 95 wt % based on the dry weight. Below 40 wt % the conductivity is inadequate and above 95 wt % the adhesion is unacceptable. It is more preferred that the silver content of the silver layer be at least 85 wt % to no more than 95 wt %.

The conductive adhesive is typically used to adhesively attach the silver layer to the lead frame which acts as the cathode lead.

Conductive adhesives containing sufficient concentrations of metal particles to achieve a low ESR in the completed capacitor are not as strong as adhesives lacking particles. As a result the mechanical strength of the connection is compromised making the connection more susceptible to failure due to heat and physical perturbations. In one embodiment a secondary adhesive is used wherein the secondary adhesive is used wherein the conductive adhesive of the present invention is primarily responsible for conductivity while still adhesively connecting the silver layer to the lead frame while the secondary adhesive is primarily responsible for adhesion with the potential for some conductivity. The combination of a conductive adhesive and a secondary adhesive provides a balance between adhesion and conductivity which is difficult to achieve by a single conductive adhesive alone.

Commercially available conductive adhesives used in the electronics industry are isotropic, silver-filled thermosetting materials sold as thixotropic pastes. Henkel/Loctite® and Emerson and Cuming are among typical suppliers.

Fillers limit the strength of an adhesive bond by disrupting the linkages in the adhesive and increasing the distance between the bound surfaces. Adhesion strength decreases as filler concentration is increased. However, as filler concentration increases the thermal coefficient of expansion decreases. An optimized concentration of fillers need to be used so as to have higher adhesive strength and low coefficient of thermal expansion. Nanomaterials such as nanoclays, carbon nanotubes, carbon nanofibers, molecular silica, nanometal powders and other similar fillers can provide lower coefficient of thermal expansion with lower concentration of fillers. This is due to the nanoscale or molecular level interaction of these fillers with the matrix binder or resin system. Such fillers can be used in the conductive adhesive composition to get good adhesion strength and low coefficient of thermal expansion.

Conductive and non-conductive fillers such as silica, nanoclay, carbon nanotubes, carbon nanofibers, molecular silica, nickel, copper, silver, silver coated copper, silver coated nickel, nickel coated carbon, carbon fibers, glass fibers, carbon black, graphite and similar materials may be added to a thermosetting adhesive to control for viscosity and thermal expansion to duplicate the physical properties of a conductive adhesive.

Figure 3A:
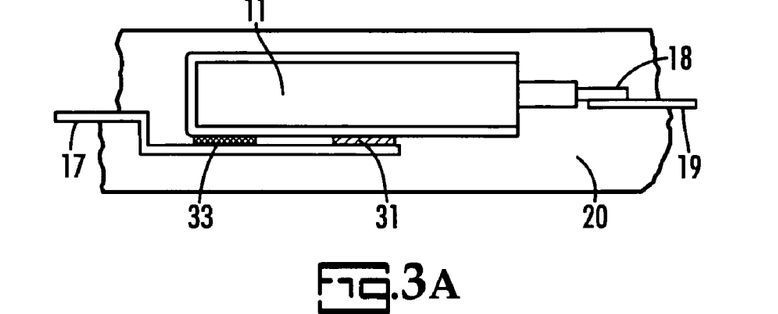
FIG. 3A is a cross-sectional view of an embodiment of the present invention.
Figure 3B:
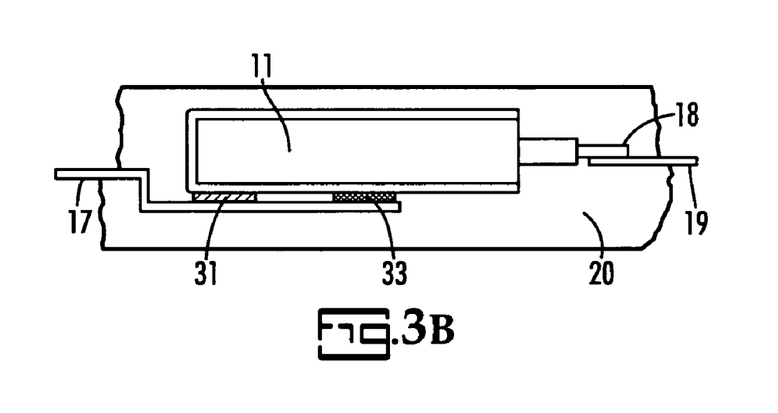
FIG. 3B is a cross-sectional view of an embodiment of the present invention.

FIGS. 3A and 3B illustrate a method for utilizing the invention. In FIG. 3A a secondary adhesive, 33, is applied on the negative side of the negative lead and a conductive adhesive in accordance with the instant invention, 31, is applied to the positive side. In FIG. 3B the positions of the conductive and secondary adhesives are reversed.

Figure 4:
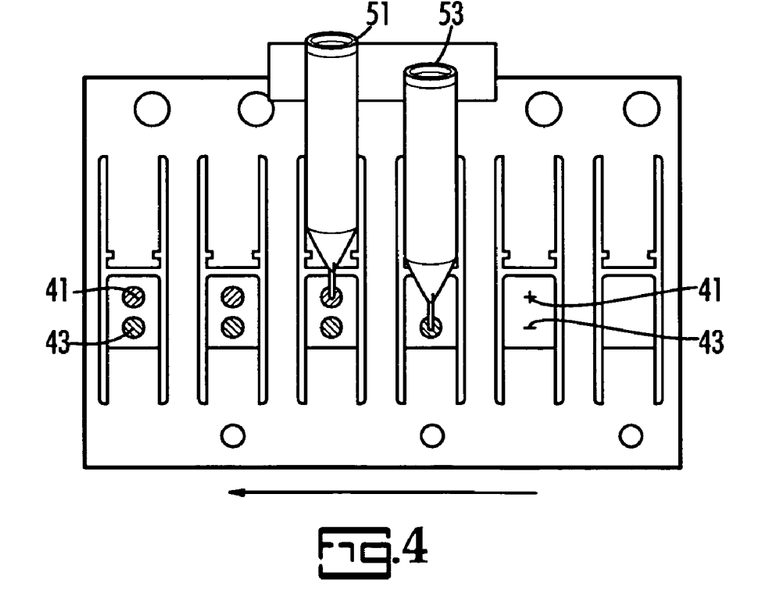
FIG. 4 is a diagram illustrating the application of conductive adhesive.

FIG. 4 illustrates a process for applying the adhesives. Cathode terminal, 17, one of many such on a master plate, passes under adhesive dispensers, 51 and 53, which deposit adhesive on the positive side, 41, or on the negative side, 43, as desired prior to joining the terminal with the cathode side of the capacitor. It would be realized that the dispensers may both dispense the adhesive of the instant invention or one of the dispensers may dispense a secondary adhesive.

For larger case sizes, additional adhesive may be applied in additional locations. It is most preferred that the conductive and secondary adhesives are co-cured.

The resin for the adhesive layer is a silver filled rapid curing resin comprising about 60-95 wt % silver and 5-40 wt % resin. The resin comprises 55-98.9 wt % epoxy monomer, 0.1-15 wt % catalyst, 1-30 wt % accelerant and up to 15 wt % filler.

The epoxy monomer is preferably an epoxide defined by the formula:

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group and in one embodiment a cyclic alkyl is particularly preferred.

It is preferred that at least one of $R^1$ and $R^2$ are substituted. Particularly preferred substituents include carboxyl, alkyl ethers and aryl ethers.

In the present disclosure aliphatic, aromatic, alkyl or aryl indicates both substituted and unsubstituted groups.

In a preferred embodiment $R^1$ is an alkyl of 1 to 5 carbons with 1 carbon being most preferred. In a preferred embodiment $R^2$ is selected from $C_6H_5O$— and cyclohexane.

The epoxy monomer is preferably selected from the group consisting of phenyl glycidyl ether epoxide and cycloaliphatic epoxide. The most preferred epoxy monomer is 3,4-epoxycyclohexyl methyl 3,4-epoxy-cyclohexane carboxylate with formula:

which is available from Dow as ERL-4221 or

In each formula each carbon represents a hydrocarbon or a carbon substituted with a halogen, a hydrocarbon group that may contain an oxygen atom or a halogen atom, or an alkoxy group that may have a substitutional group.

A particularly preferred catalyst is a quarternary ammonium salt of strong acids preferably with a pKa of at least 10 and most preferably selected from the group of super acid catalyst based on ammonium antimony hexafluoride, metal salt of triflic acid, quarternary ammonium triflate and their derivatives.

The accelerant is preferably defined by the formula:

wherein $R^3$ is an alkyl of 1-10 carbons;
$R^4$ is an alkyl of 1-10 carbons with the proviso that at least one of $R^3$ and $R^4$ is substituted with $OR^5$ wherein $R^5$ is selected from hydrogen, alkyl or aryl. Particularly preferred compounds are selected from:

wherein n is an integer of 1 to 100 and R6 and R7 are preferably selected from hydrogen and hydroxyl; and In another embodiment R= wherein $R^8$ and $R^9$ are preferably selected from hydrogen and hydroxyl.

The accelerant is bi functional oxetane or trimethylolpropane oxetane. Oxetane is a bifunctional compound having both an oxetanyl ring and an alcohol substituent on a side chain ($R^3$ or $R^4$). The hydroxyl group accelerates cure speed by reacting with propagating chain ends.

The silver is preferably provided as a silver coated with acids. The acidic surface of the silver flake also aids in accelerating the cure reaction. U.S. Pat. No. 4,273,583 describes a process for preparing silver flake with oleic acid, linoleic acid, stearic acid and linolenic acid surfactants. It is most preferred that the silver is a silver flake coated with oleic acid or stearic acid.

The silver particles are preferably flakes or powders with particle sizes of 50 nm to 15 µm.

The resin may contain additional adjuvants such as flexibilizers, toughening agents, silica, adhesion promoters such as silane coupling agents, rheological modifiers, conductive fillers, dispersing additives and deairing additives. Flexibilizing additives include carboxy-terminated butadiene acrylonitrile (CTBN) modified epoxy monomers, polyester polyols, silicone modified epoxy monomers and similar molecules with flexible chains in the molecule. Adhesion promoters include silane coupling agents with amino or epoxy functional groups.

Rheological modifiers include nanoclays, bentonite, nanosilica and the like.

Conductive fillers include tin, copper, nickel, silver coated copper, gold, cobalt, graphite, silver coated graphite, nickel coated graphite, carbon nanotubes, mixtures and the like. The conductive filler may be in a powder or flake form with flake form being preferred. The flake preferably has a thickness of less than about 2 µm with planar dimensions of about 20 to 25 µm. The surface area of the flake is preferably about 0.15 to 5.0 $m^2$/g with a density of about 0.4 to 5.5 g/cc. The preferred powder has a diameter of about 0.5 to 15 µm.

A particular advantage of the resin is the ability to quickly cure. The resin is considered cured when the reaction is substantially complete as indicated by differential scanning calorimetry which indicates an exotherm below 110° C. The resin can cure at temperatures above about 110° C. in less than about 20 seconds. More preferably the resin can cure in about 10 to less about 20 seconds. It is more preferably to cure at above about 140° C. since this further decreases the cure time. A particularly preferred embodiment cures in less than 16 seconds at 140° C. or higher. This greatly increases the manufacturing efficiency and decreases the amount of resin flow which occurs prior to setting of the resin.

Figure 2:
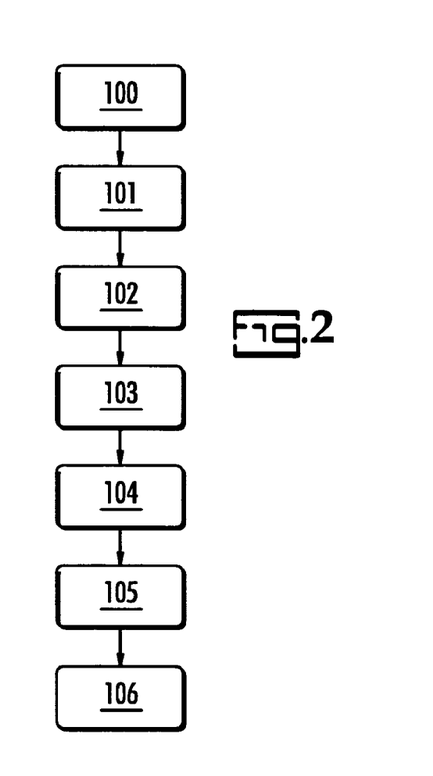
FIG. 2 is a flow chart representation of the process of the present invention.

The process for forming the capacitor is illustrated in FIG. 2.

Referring to FIG. 2, the anode is formed, 100, from a valve metal as described further herein.

The valve-metal is preferably selected from niobium, aluminum, tantalum, titanium, zirconium, hafnium, tungsten and alloys or combinations thereof. Aluminum, tantalum and niobium are most preferred. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The valve metal is preferably etched to increase the surface area particularly if the valve metal is a foil such as aluminum foil. Etching is preferably done by immersing the valve metal into at least one etching bath. Various etching baths are taught in the art and the method used for etching the valve metal is not limited herein.

A dielectric is formed, 101, on the surface of the valve metal. It is most desirable that the dielectric layer be an oxide of the valve metal. The oxide is preferably formed by dipping the valve metal into an electrolyte solution and applying a positive voltage to the valve metal. Electrolytes for the oxide formation can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the oxide on the valve metal including aqueous solutions of dicarboxylic acids, such as ammonium adipate are also known. Other materials may be incorporated into the oxide such as phosphates, citrates, etc. to impart thermal stability or chemical or hydration resistance to the oxide layer.

A conductive layer is formed, 102, on the surface of the oxide. The conductive layer acts as the cathode of the capacitor. The cathode can be an organic material such as 7,7',8,8'-tetracyanoquinodimethane complex. Particularly the cathode can be intrinsically conducting polymers. Mentioned as exemplary polymers are polymerized aniline, polymerized pyrrole, polymerized thiophenes, and derivatives thereof. The cathode layer can also comprise manganese dioxide. The manganese dioxide layer is preferably obtained by immersing an anode element in an aqueous manganese nitrate solution. The manganese oxide is then formed by thermally decomposing the nitrate at a temperature of from 200° to 350° C. in a dry or steam atmosphere. The anode may be treated multiple times to insure optimum coverage.

The conducting polymer is preferably chosen from polypyrroles, polyanilines, polythiophenes and polymers comprising repeating units of Formula I, particularly in combination with organic sulfonates:

FORMULA 1 wherein $R^1$ and $R^2$ are chosen to prohibit polymerization at the beta-site of the ring and X is S, Se or N.

A particularly preferred polymer is 3,4-polyethylene dioxythiophene (PEDT).

The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

After conductive cathode layer formation, 102, a carbon layer is applied, 103, by spraying or dipping.

A silver layer is applied, 104, onto the carbon layer preferably by spraying or dipping.

It is preferred that each layer be at least partially dried prior to coating of the subsequent layer thereon. Alternatively, the layers may be coated in a wet-on-wet fashion with adequate surface tension in each layer to prohibit substantial mixing of the layers. The layers can then be dried, or cured, simultaneously.

The inventive adhesive is added, preferably to a lead frame, and the silver layer is adhered to the lead frame, 105.

The capacitor is finished, 106, by incorporating anode and cathode terminals and external insulators as known in the art.

In surface mount capacitors silver adhesive is typically used to 'glue' the silver layer to the lead frame which serves as the cathode lead. For leaded devices solder is often used to attach a cathode lead to the silver layer.

It is preferable to include adjuvants to the carbon coating solution to facilitate wetability and leveling properties of the coating solution. Particularly preferred wetting agents include fluorinated surfactants such as those supplied by DuPont de Nemours under the trade name Zonyl, which are preferably added in an amount of up to 1 wt % of the coating solution.

EXAMPLES

Peel strength testing is used to measure the force required to break the negative plates after construction of the leadframe to the cathode. The test can be performed at room temperature (cold peel) or at 162° C. (hot peel).

A sample strip is placed onto a load plate via locater pins and spring loaded hold down bars. If a hot peel test is required, a heater is turned on with the load plate in the test chamber for a specified time. When ready, the first strip can be loaded and moved into the tester, with the lead-frame side up, where it should wait 1 minute before testing.

The first part to be tested is aligned under a pin affixed to a Chatillion gauge. It is aligned to an area where the pin will contact as close to the center of the cathode as possible. The pin shall not contact the leadframe. Once the test has started, the pin will push down on the cathode and the break force is displayed on the gauge. The strip can be repositioned at a minimum distance to every other part for additional sampling.

A series of identical tantalum anodes were prepared. The tantalum was anodized to form a dielectric on the tantalum anode. In one set of samples a manganese dioxide cathode was formed on the dielectric with carbon and silver layers applied thereto respectively. On an identical set of samples a polymeric cathode was formed utilizing polyethylenedioxythiophene with carbon and silver layers applied thereto respectively. For the purposes of demonstration of the present invention the anode and cathode used are not particularly important except that it is preferable for them to be identical up to the application of the adhesive such that relative comparisons can be made. The capacitors with manganese dioxide cathodes were split into two groups. In a control group a snap cure adhesive available from Emerson and Cuming as XCE-3111 was applied to the lead frame and the capacitor adhered thereto. In the inventive group, Example 1, a conductive adhesive comprising 26 grams vinylcyclohexane dioxide, available as ERL-4221 from Dow Chemicals, 76 grams of silver flake, available as SF63 from Ferro Corp., 0.7 grams of electronic grade quarternary ammonium triflate catalyst, available as XCE-1623 from Kings Industries and 1.2 grams of Oxetane, available as TMPO from Perstorp, was applied to the lead frame and the capacitor adhered thereto. The control samples were cured at 125° C. and the inventive samples were cured at 110° C. Both the control and inventive samples were subjected to a peel strength test. The control samples had an average peel strength of only 6.37 g/m² versus an average of 21.83 g/m² for the inventive samples regardless of the lower curing temperature for the inventive samples.

The capacitors with the polymer cathode were split into two groups. In a control group a snap cure adhesive available from Henkel as Hysol 519HT02 was applied to the lead frame and the capacitor adhered thereto. In the inventive group a conductive adhesive comprising 17 grams vinylcyclohexane dioxide, available as ERL-4221 from Dow Chemicals, 76 grams of silver flake, available as SF63LV from Ferro Corp., 2.75 grams of catalyst, available as XCE-1623 fromKings Industries and 2 grams of Oxetane, available as TMPO from Perstorpwas applied to the lead frame and the capacitor adhered thereto. The control samples were cured at 190° C. and the inventive samples were cured at 110° C. Both the control and inventive samples were subjected to a peal strength test. The control samples had an average peel strength of only 8.09 g/m² versus an average of 22.84 g/m² for the inventive samples regardless of the lower curing temperature for the inventive samples.

Figure 5:
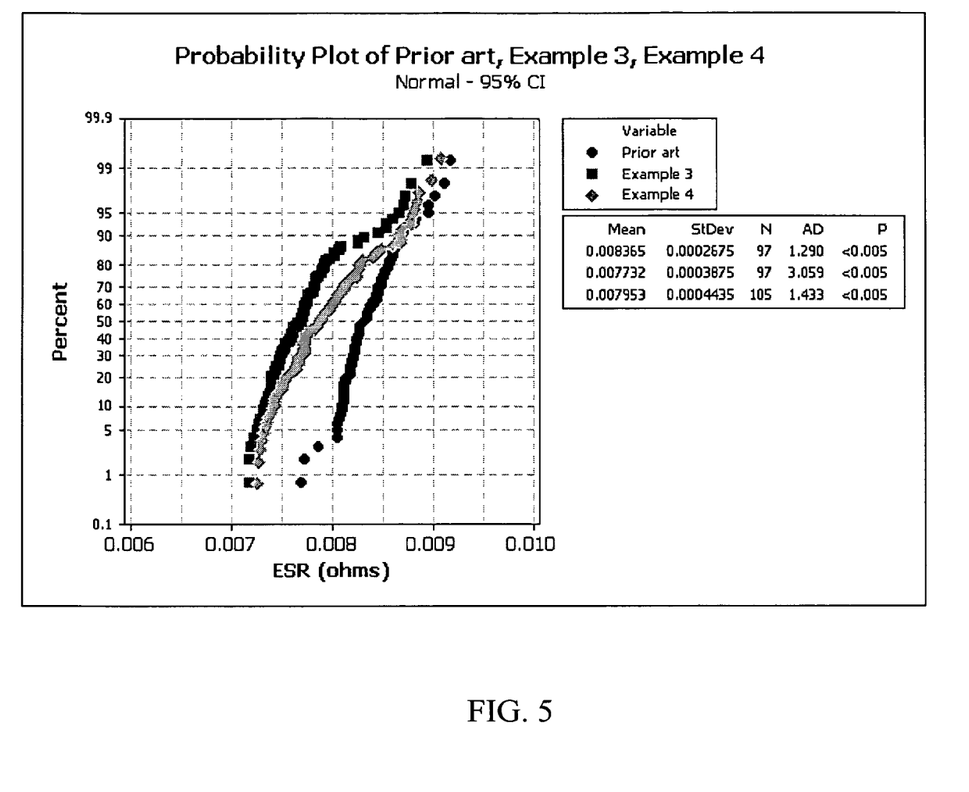
FIG. 5 is a graph illustrating the improved electrical properties of the inventive capacitors.

A series of samples were made to determine the impact of adhesive on ESR. Three sets of samples were made. The control sample (QS) was based on prior art formulations comprising epoxy and anhydride with imidazole catalysts with tantalum anodes and a conductive polymer cathode. An inventive sample (example 3) utilized tantalum anode with conducting polymer cathode. The inventive adhesive comprised 21 grams of cycloaliphatic epoxy ERL-4221, 5.2 grams of CTBN modified epoxy, available from Resolution Performance Products under the trade name epoN 58034, 76 grams of silver flake, available from Ferro Corp under the trade name SF 70, 0.7 grams of quarternary ammonium triflate available as XCE-1612 from Kings Industries, and 5.2 grams of Oxetane. A second inventive sample (example 4) utilized a tantalum anode with conducting polymer cathode. The inventive adhesive comprised 21 grams of cycloaliphatic epoxy ERL-4221, 2.6 grams of polyester polyol, available as K-FLEX®XM-A307 from Kings Industries, 76 grams of silver flake, available as SF 70 from Ferro Corp., 0.7 grams of catalyst XCE 1612 and 2.6 grams of oxetane. The ESR for the samples was measured and plotted in FIG. 5. As seen in FIG. 5 the inventive samples have an improved ESR relative to the control.

The invention has been described with particular emphasis on the preferred embodiments. One of skill in the art would realize additional embodiments, alterations, and advances which, though not enumerated, are within the invention as set forth more specifically in the claims appended hereto.

The invention claimed is:

1. A conductive adhesive comprising:

60-95 wt % conductor;

5-40 wt % resin;

wherein said resin comprises:

55-98.9 wt % monomer defined by the formula:

wherein: R is an aliphatic group of 1 to 10 carbons;

$R^1$ is an aliphatic group of 1 to 10 carbons;

$R^2$ is an alkyl, alkyl ether, aryl ether, silane or silicone; and wherein R and $R^1$, R and $R^2$ or $R^1$ and $R^2$ may be taken together to form a cyclic alkyl or aryl group;

0.1-15 wt % catalyst;

1-30 wt % accelerant defined by the formula:

wherein $R^3$ is an alkyl or substituted alkyl of 1-10 carbons; and $R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and 0-15 wt % filler.

2. The conductive adhesive of claim 1 wherein either said R and $R^1$ or said $R^1$ and $R^2$ are taken together to form a group selected from cyclic alkyl and cyclic aryl.

3. The conductive adhesive of claim 1 wherein said $R^1$ is an alkyl group of 1 to 5 carbons.

4. The conductive adhesive of claim 1 wherein said $R^2$ is selected from $C_6H_5O$— and $C_6H_{11}$.

5. The conductive adhesive of claim 1 wherein said monomer is selected from the group consisting of a phenyl glycidyl ether epoxide and a cycloaliphatic epoxide.

6. The conductive adhesive of claim 5 wherein said monomer is 3,4-epoxycyclohexyl methyl 3,4-epoxy-cyclohexane carboxylate.

7. The conductive adhesive of claim 1 wherein said catalyst is a quarternary ammonium salt of a strong acid.

8. The conductive adhesive of claim 1 wherein said catalyst comprises an element selected from ammonium antimony hexafluoride, metal salt of triflic acid and quarternary ammonium triflate.

9. The conductive adhesive of claim 1 wherein said accelerant is selected from wherein n is an integer of 1 to 100 and $R^6$ and $R^7$ are preferably selected from hydrogen and hydroxyl; and wherein $R^8$ or $R^9$ is —OH.

10. The conductive adhesive of claim 1 wherein said accelerant is selected from functional oxetane and trimethylolpropane oxetane.

11. The conductive adhesive of claim 1 wherein said conductor comprises an acid coated silver.

12. The conductive adhesive of claim 11 wherein said silver comprises a silver flake or silver powder.

13. The conductive adhesive of claim 12 wherein said silver flake or powder has a particle size of 50 nm to 15 μm.

14. The conductive adhesive of claim 11 wherein said acid coating is selected from oleic acid, linoleic acid, stearic acid, linolenic acid and isooctadecanoic acid.

15. The conductive adhesive of claim 1 wherein one of said conductor and said filler comprises at least one material selected from tin, copper, nickel, silver, gold, cobalt, silver coated copper, silver coated nickel, gold coated silver, gold coated copper, gold coated nickel, silver coated graphite, nickel coated graphite, silver coated nickel, nickel coated carbon, graphite, carbon nanotubes, nanoclay, bentonite, nanosilica, silica, carbon nanofibers, molecular silica, carbon fibers, glass fibers, silver oxide and carbon black.

16. The conductive adhesive of claim 1 wherein said conductive adhesive has a cure time of less than 20 seconds at 110° C.

17. The conductive adhesive of claim 1 comprising up to 10 wt % carbon nanotubes.

18. The conductive adhesive of claim 1 comprising up to 5 wt % nanosilica.

19. The conductive adhesive of claim 1 wherein said monomer is selected from

20. A capacitor comprising:
an anode;
a dielectric coated on said anode;
a conductive layer coated on said dielectric;
a cathode lead; and
a conductive adhesive layer between said conductive layer and said cathode lead wherein said conductive adhesive layer comprises:
60-95 wt % silver;
5-40 wt % resin;

wherein said resin comprises:

55-98.9 wt % monomer defined by the formula:

$$\underset{R}{\triangle}\!\!\!\!\!\overset{O}{\phantom{x}}\!\!\!\!\!\underset{R^1}{\phantom{x}}R^2$$

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group;
0.1-15 wt % catalyst;
1-30 wt % accelerant defined by the formula:

[structure with $R^3$, $R^4$ on oxetane ring]

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

21. The capacitor of claim 20 wherein said anode comprises a valve metal.

22. The capacitor of claim 21 wherein said valve metal is selected from niobium, aluminum, tantalum, titanium, zirconium, hafnium, tungsten and oxides, nitrides or alloys thereof.

23. The capacitor of claim 20 wherein either said R and $R^1$ or said $R^1$ and $R^2$ are taken together to form a group selected from cyclic alkyl and cyclic aryl.

24. The capacitor of claim 20 wherein said $R^1$ is an alkyl group of 1 to 5 carbons.

25. The capacitor of claim 20 wherein said $R^2$ is selected from $C_6H_5O$— and $C_6H_{11}$.

26. The capacitor of claim 20 wherein said monomer is selected from the group consisting of a phenyl glycidyl ether epoxide and a cycloaliphatic epoxide.

27. The capacitor of claim 26 wherein said monomer is 3,4-epoxycyclohexyl methyl 3,4-epoxy-cyclohexane carboxylate.

28. The capacitor of claim 20 wherein said catalyst is a quarternary ammonium salt of a strong acid.

29. The capacitor of claim 20 wherein said catalyst comprises an element selected from ammonium antimony hexafluoride, metal salt of triflic acid and quarternary ammonium triflate.

30. The capacitor of claim 20 wherein said accelerant is selected from

[oxetane structure with OH]

-continued

[structure with $R^6$, $R^7$ oxetane-phenyl-oxetane]

wherein n is an integer of 1 to 100 and $R^6$ and $R^7$ are preferably selected from hydrogen and hydroxyl;
and

[cubic silsesquioxane structure with R groups]

$R =$ [structure with oxetane]  or

[structure with $R^8$, $R^9$ and oxetane]

wherein $R^8$ or $R^9$ is —OH.

31. The capacitor of claim 20 wherein said accelerant is selected from functional oxetane and trimethylolpropane oxetane.

32. The capacitor of claim 20 wherein said silver comprises an acid coating.

33. The capacitor of claim 32 wherein said silver comprises a silver flake or silver powder.

34. The capacitor of claim 33 wherein said silver flake has a particle size of 50 nm to 15 μm.

35. The capacitor of claim 32 wherein said acid coating is selected from oleic acid, linoleic acid, stearic acid, linolenic acid and isooctadecanoic acid.

36. The capacitor of claim 20 wherein said filler comprises at least one material selected from tin, copper, nickel, silver, gold, cobalt, silver coated copper, silver coated graphite, nickel coated graphite, silver coated nickel, nickel coated carbon, graphite, carbon nanotubes, nanoclay, bentonite, nanosilica, silica, carbon nanofibers, molecular silica, carbon fibers, glass fibers, silver oxide and carbon black.

37. The capacitor of claim 20 wherein said conductive adhesive has a cure time of less than 20 seconds at 110° C.

38. The capacitor of claim 20 wherein said adhesive comprises up to 10 wt % carbon nanotubes.

39. The capacitor of claim 20 wherein said adhesive comprises up to 5 wt % nanosilica.

40. The capacitor of claim 20 wherein said monomer is selected from and

41. A process for forming a capacitor comprising:
forming an anode;
forming a dielectric layer on said anode;
forming a conductive layer on said dielectric layer;
applying a conductive adhesive to said conductive layer
wherein said conductive adhesive comprises:
60-95 wt % silver;
5-40 wt % resin;
wherein said resin comprises:
55-98.9 wt % monomer defined by the formula:

wherein: R is an aliphatic group of 1 to 10 carbons;
$R^1$ is an aliphatic group of 1 to 10 carbons;
$R^2$ is an alkyl, alkyl ether, aryl ether, silane or silicone; and
wherein R and $R^1$, R and $R^2$ or $R^1$ and $R^2$ may be taken together to form a cyclic alkyl or aryl group;
0.1-15 wt % catalyst;
1-30 wt % accelerant defined by the formula:

wherein $R^3$ is an alkyl or substituted alkyl of 1-10 carbons; and
$R^4$ is an alkyl or substituted alkyl of 1-10 carbons with the proviso that at least one of $R^3$ and $R^4$ is substituted with a $OR^5$ wherein $R^5$ is selected from hydrogen, alkyl and aryl; and
0-15 wt % filler.

42. The process for forming a capacitor of claim 41 wherein said anode comprises a valve metal.

43. The process for forming a capacitor of claim 42 wherein said valve metal is selected from niobium, aluminum, tantalum, titanium, zirconium, hafnium, tungsten and oxides, nitrides or alloys thereof.

44. The process for forming a capacitor of claim 41 wherein either said R and $R^1$ or said $R^1$ and $R^2$ are taken together to form a group selected from cyclic alkyl and cyclic aryl.

45. The process for forming a capacitor of claim 41 wherein said $R^1$ is an alkyl group of 1 to 5 carbons.

46. The process for forming a capacitor of claim 41 wherein said $R^2$ is selected from $C_6H_5O$— and $C_6H_{11}$.

47. The process for forming a capacitor of claim 41 wherein said monomer is selected from the group consisting of a phenyl glycidyl ether epoxide and a cycloaliphatic epoxide.

48. The process for forming a capacitor of claim 47 wherein said monomer is 3,4-epoxycyclohexyl methyl 3,4-epoxy-cyclohexane carboxylate.

49. The process for forming a capacitor of claim 41 wherein said catalyst is a quarternary ammonium salt of a strong acid.

50. The process for forming a capacitor of claim 41 wherein said catalyst comprises an element selected from ammonium antimony hexafluoride, metal salt of triflic acid and quarternary ammonium triflate.

51. The process for forming a capacitor of claim 41 wherein said accelerant is selected from wherein n is an integer of 1 to 100 and $R^6$ and $R^7$ are preferably selected from hydrogen and hydroxyl;
and wherein $R^8$ or $R^9$ is —OH.

52. The process for forming a capacitor of claim 41 wherein said accelerant is selected from functional oxetane and trimethylolpropane oxetane.

53. The process for forming a capacitor of claim 41 wherein said silver comprises an acid coating.

54. The process for forming a capacitor of claim 53 wherein said silver is a silver flake.

55. The process for forming a capacitor of claim 54 wherein said silver flake has a particle size of 50 nm to 15 μm.

56. The process for forming a capacitor of claim 53 wherein said acid coating is selected from oleic acid, linoleic acid, stearic acid, linolenic acid and isooctadecanoic acid.

57. The process for forming a capacitor of claim 41 wherein said filler comprises at least one material selected from tin, copper, nickel, silver, gold, cobalt, silver coated copper, silver coated graphite, nickel coated graphite, silver coated nickel, nickel coated carbon, graphite, carbon nanotubes, nanoclay, bentonite, nanosilica, silica, carbon nanofibers, molecular silica, carbon fibers, glass fibers and carbon black.

58. The process for forming a capacitor of claim 41 wherein said conductive adhesive has a cure time of less than 20 seconds at 110° C.

59. The process for forming a capacitor of claim 41 wherein said adhesive comprises up to 10 wt % carbon nanotubes.

60. The process for forming a capacitor of claim 41 wherein said adhesive comprises up to 5 wt % nanosilica.

61. The process for forming a capacitor of claim 41 said monomer is selected from

* * * * *